(12) United States Patent
Miftakhutdinov et al.

(10) Patent No.: US 8,134,850 B2
(45) Date of Patent: Mar. 13, 2012

(54) SYSTEMS AND METHODS FOR FREQUENCY CONTROL OF A VOLTAGE CONVERTER

(75) Inventors: Rais K. Miftakhutdinov, Cary, NC (US); Lin Sheng, Raleigh, NC (US); John R. Wiggnehorn, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 360 days.

(21) Appl. No.: 12/022,378

(22) Filed: Jan. 30, 2008

(65) Prior Publication Data

US 2009/0016082 A1   Jan. 15, 2009

Related U.S. Application Data

(60) Provisional application No. 60/949,655, filed on Jul. 13, 2007.

(51) Int. Cl.
*H02M 7/5387* (2007.01)
*H02M 1/15* (2006.01)
*H02M 3/335* (2006.01)

(52) U.S. Cl. .................. 363/98; 363/17; 363/40

(58) Field of Classification Search ............ 363/17, 363/25, 40, 98, 132
See application file for complete search history.

(56) References Cited

U.S. PATENT DOCUMENTS

| 4,843,202 | A | * | 6/1989 | Smith et al. ............ 219/716 |
| 5,267,138 | A | * | 11/1993 | Shores .................... 363/98 |
| 5,920,473 | A | * | 7/1999 | Sturgeon ................. 363/98 |
| 6,301,128 | B1 | * | 10/2001 | Jang et al. ............... 363/17 |
| 6,944,034 | B1 | * | 9/2005 | Shteynberg et al. ....... 363/21.13 |
| 7,116,014 | B1 | | 10/2006 | Herbert |
| 7,187,562 | B2 | * | 3/2007 | Stojcic et al. ............ 363/17 |
| 2004/0218406 | A1 | * | 11/2004 | Jang et al. ............... 363/37 |
| 2005/0094330 | A1 | | 5/2005 | Guenther et al. |
| 2006/0262575 | A1 | * | 11/2006 | Schlecht et al. .......... 363/17 |
| 2007/0019442 | A1 | * | 1/2007 | Li et al. .................. 363/15 |
| 2007/0076445 | A1 | * | 4/2007 | Boke ..................... 363/17 |
| 2007/0076450 | A1 | | 4/2007 | Kumar et al. |
| 2008/0290812 | A1 | * | 11/2008 | Mizutani et al. .......... 315/276 |

FOREIGN PATENT DOCUMENTS

WO   WO 2006041102 A1 *   4/2006

OTHER PUBLICATIONS

U.S. Appl. No. 12/022,965, filed Jan. 30, 2008, Miftakhutdinov et al.

(Continued)

*Primary Examiner* — Adolf Berhane
*Assistant Examiner* — Fred E Finch, III
(74) *Attorney, Agent, or Firm* — William B. Kempler; Wade J. Brady, III; Frederick J. Telecky, Jr.

(57) ABSTRACT

Various embodiments of the present invention provide voltage converters and methods for using such. As one example, a voltage converter is disclosed that includes a transformer, an operational detector, and a controllable oscillator. The transformer includes a first winding and a second winding, and the operational detector provides an electrical output corresponding to an operational characteristic of the transformer. The controllable oscillator provides a clock output with a frequency corresponding to the electrical output. This clock output at least in part controls application of a voltage input to the first winding.

20 Claims, 5 Drawing Sheets

OTHER PUBLICATIONS

Miftakhutdinov et al., "New Generation Intermediate Bus Converter", Oct. 30, 2007, Presentation Handouts from Conference, pp. 1-13, Dallas, TX.

Miftakhutdinov et al., "New Generation Intermediate Bus Converter", Oct. 30, 2007, Paper Presented at Conference, pp. 1-8, Dallas, TX.

Barry, "Design Issues in Regulated and Unregulated Intermediate Bus Converters", 2004, APEC 2004 Conference Proceedings, pp. 1389-1394.

Mills, "An Alternative Power Architecture for Next Generation Systems", 2004, IPEMC 2004 Conference Proceedings, pp. 67-72.

White, "Emerging On-Board Power Architectures", 2003, APEC 2003 Conference Proceedings, pp. 799-804.

No Author, "Selection of Architecture for Systems using Bus Converters and POL Converters", May 2005 Design Note 023, Ericsson Inc., pp. 1-.

\* cited by examiner

SYSTEMS AND METHODS FOR FREQUENCY CONTROL OF A VOLTAGE CONVERTER

CROSS REFERENCE TO RELATED APPLICATION

The present application claims priority to (i.e., is a nonprovisional of) U.S. Pat. App. No. 60/949,655 entitled "Frequency Control Circuit for Unregulated Intermediate Bus Voltage Converter and Method Thereof", and filed Jul. 13, 2007 by Miftakhutdinov et al. The entirety of the aforementioned application is incorporated herein by reference for all purposes.

BACKGROUND OF THE INVENTION

The present invention is related to power supplies, and in particular to voltage converters.

Electrical power requirements are typically satisfied by deploying one or more power supplies in relation to a particular system. For example, telecommunication and data communication systems often employ power supplies deployed in relation to an Intermediate Bus Architecture (IBA). In some such cases, the IBA based system includes a front end AC-DC power supply that generates a DC voltage. This DC voltage is supplied to the input of an Intermediate Bus Converter (IBC) that provides isolation and converts the input voltage to a lower level DC voltage supplying numerous so called point-of-load regulators (POLs). The non-isolated POLs provide required supply voltages to specific digital or analog electronic functional blocks. The POLs are generally located close to the related electronic blocks to provide highest quality supply voltages.

The aforementioned IBC may be implemented using one of the topologies depicted in FIGS. 1a-1c. In particular, FIG. 1a shows a forward type full-bridge voltage converter topology 110, FIG. 1b shows a half-bridge voltage converter topology 120, and FIG. 1c depicts a push-pull voltage converter topology 130. Depending on input voltage range and output voltage tolerances, the IBC can be regulated with feedback loop taken from its output voltage, semi-regulated by input voltage feed-forward, or simply unregulated. Unregulated IBC implementations are often more cost effective, and generally operate at a maximum duty cycle for highest efficiency and power density.

Such unregulated voltage converters exhibit various performance limits. For example, operation at the typical maximum duty cycle results in very low ripple current at a nominal condition because the voltage after the rectification has practically a one hundred percent duty cycle. During start up, however, the duty cycle is gradually increased from zero to one hundred percent. The output inductor peak-to-peak current ripple AIL is defined by the following equation:

$$\Delta IL = \frac{Vin * D(1-D)}{2*N*L*F},$$

where Vin is the voltage input to the primary winding of any of the circuits of FIG. 1a-1c, D is the duty cycle, and F is the frequency of the clock provided to transistors connected to the voltage input side of the circuits of FIGS. 1a-1c, L is the inductor on the voltage output side of the circuits of FIGS. 1a-1c; and N it the turns ratio of the transformer of the circuits of FIGS. 1a-1c. Based on this equation, during start-up the current ripple will become substantial as the circuits of FIGS. 1a-1c transition from a duty cycle of zero to a duty cycle of one hundred percent. One previous solution to resolving this problem has been to design for the increased ripple during start-up or to greatly increase the size of the inductor in the circuits of FIGS. 1a-1c. It is often not acceptable to have such a high current ripple, and adding a large inductor can substantially increase the cost, size and power losses of such IBC circuits.

Thus, for at least the aforementioned reasons, there exists a need in the art for advanced approaches to voltage conversion.

BRIEF SUMMARY OF THE INVENTION

The present invention is related to power supplies, and in particular to voltage converters.

Various embodiments of the present invention provide voltage converters that include a transformer, an operational detector, and a controllable oscillator. The transformer includes a first winding and a second winding, and the operational detector provides an electrical output corresponding to an operational characteristic of the transformer. The controllable oscillator provides a clock output with a frequency corresponding to the electrical output. This clock output at least in part controls application of a voltage input to the first winding.

In some instances of the aforementioned embodiments, the voltage converter further includes a transistor with one leg electrically coupled to the first winding and another leg electrically coupled to the voltage input. In the aforementioned instances, a duty cycle controlled clock that is generated based on the clock output is applied to the gate of the transistor. In some such instances, the operational detector includes a frequency controller that detects a frequency of the duty cycle controlled clock. In such instances, the electrical output corresponds to the frequency of the duty cycle controlled clock.

In other instances of the aforementioned embodiments, the voltage converter further includes two transistors and clock generator. A first leg of the first transistor is electrically coupled to the first winding and a second leg of the first transistor is electrically coupled to the voltage input. A first leg of the second transistor is electrically coupled to the first winding and a second leg of the second transistor is electrically coupled to the voltage input. The clock generator receives the clock output and provides a first duty cycle controlled clock signal to a gate of the first transistor and a second duty cycle controlled clock signal to a gate of the second transistor. In some such instances, the operational detector includes a frequency controller with a logic function that logically combines the first duty cycle controlled clock with the second duty cycle controlled clock. An output of the logic function is filtered to create a first average voltage, and the output of the logic function is inverted and the inverted output is filtered to create a second average voltage. The first averaged voltage and the second averaged voltage are multiplied to create the electrical output. In other instances, the output of the logic function is filtered to create an average voltage. The frequency controller includes a multiplexer with its selector input being electrically coupled to an inverted version of the output of the logic function. One input of the multiplexer is the average voltage, and another input of the multiplexer is a reference voltage. In some such instances, the reference voltage is a ground, and the logic function is an OR function. In other such instances, the average voltage is a first average voltage, an output of the multiplexer is filtered to create a second average voltage, and the second average voltage is the electrical output.

In yet other instances of the aforementioned embodiments, the operational detector includes a current sense circuit that is operable to sense a current associated with the first winding. In such instances, the electrical output corresponds to the current associated with the first winding. The voltage converter may include a voltage output that is electrically coupled to the second winding.

Other embodiments of the present invention provide methods for current variance limited voltage conversion. Such methods include providing a transformer with a first winding and a second winding, and applying a periodically gated voltage input to the first winding. At times, the periodic gating may exhibit a time varying duty cycle and a time varying frequency. The methods further include maintaining a mathematical combination of the time varying duty cycle and the time varying frequency substantially constant. In some instances of the aforementioned embodiments, the mathematical combination is defined by the product:

(time varying duty cycle)(1−time varying duty cycle)/ (time varying frequency).

In some instances of the aforementioned embodiments, maintaining the mathematical combination of the time varying duty cycle and the time varying frequency substantially constant includes sensing a current passing through the first winding.

In various instances of the aforementioned embodiments, the methods further include providing a first transistor with a first leg of the first transistor being electrically coupled to the first winding and a second leg of the first transistor being electrically coupled to the voltage input; and a second transistor with a first leg of the second transistor being electrically coupled to the first winding and a second leg of the second transistor being electrically coupled to the voltage input. The methods further include providing a clock generator that receives a clock signal and provides a first duty cycle controlled clock signal and a second duty cycle controlled clock signal. In such cases, applying the periodically gated voltage input includes applying the first duty cycle controlled clock signal to a gate of the first transistor and applying the second duty cycle controlled clock signal to a gate of the second transistor.

Yet further embodiments of the present invention provide power distribution systems with at least one voltage converter. The voltage converter includes a transformer with a first winding and a second winding, an operational detector and a controllable oscillator. The operational detector provides an electrical output corresponding to an operational characteristic of the transformer, and the controllable oscillator provides a clock output with a frequency corresponding to the electrical output. In such cases, the clock output at least in part controls application of a voltage input to the first winding, and a voltage output is electrically coupled to the second winding. In some such power distribution systems, the operational characteristic of the transformer is a current traversing the first winding. In other such power distribution systems, the operational characteristic of the transformer is a duty cycle of a clock gating a voltage input to the first winding.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 3c is a timing diagram showing an exemplary relationship between various signals of the controller of FIG. 3a.

DETAILED DESCRIPTION OF THE INVENTION

Figure 1A:
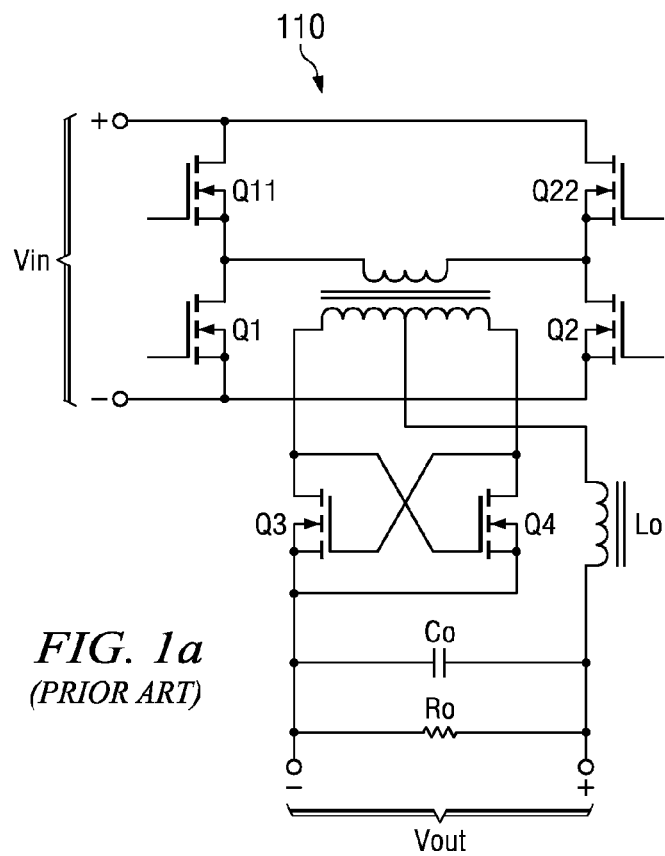
FIGS. 1a-1c depict various prior art voltage converters.

The present invention is related to power supplies, and in particular to voltage converters.

Various embodiments of the present invention provide voltage converters and methods for using such. Such voltage converters may include a transformer with a primary and secondary winding, an operational detector, and a controllable oscillator. The operational detector provides an electrical output corresponding to an operational characteristic of the transformer. The operational characteristic may be, but is not limited to, a duty cycle of the transformer, or a current ripple sensed on the primary side of the transformer. The controllable oscillator provides a clock output with a frequency corresponding to the electrical output. This clock output at least in part controls application of a voltage input to the primary winding. Based on the disclosure provided herein, one of ordinary skill in the art will recognize other operational characteristics that may be used to provide the desired feedback control. As just some advantages, in some cases the aforementioned embodiments increase efficiency and power density by reducing the size and ripple current of output inductor, and offer improved start-up characteristics where a large capacitive load exists by reducing the peak to average ratio of output inductor current.

In some instances of the aforementioned embodiments, the voltage converter further includes a transistor with one leg electrically coupled to the first winding and another leg electrically coupled to the voltage input. As used herein, the phrase "electrically coupled" is used in its broadest sense to mean a coupling whereby an electrical signal can pass from one node to another. Thus, two nodes may be electrically coupled directly via, for example, a wire, a resistor, or the like, or indirectly via, for example, an intervening electrical device such as a transistor, an opto-isolator, or a capacitor. In such an indirect coupling, a derivative of the electrical signal may be passed, such as in the case of a transistor, where an electrical signal is connected to the gate of the transistor causing a derivative of the electrical signal to be provided from the source of the transistor. In any event, such an indirect coupling from gate to source would be considered an electrical coupling for purposes of this document. Also, as used herein, the term "leg" is used in its broadest sense to mean a transistor input. Thus, in the case of a FET, a leg may be, but is not limited to, a source or a drain node of the transistor. Also, where the term "gate" is used, it is used in its broadest sense to mean a transistor input that is capable of controlling activity at another leg. Based on the disclosure provided herein, one of ordinary skill in the art will recognize a variety of "legs" and "gates" depending upon the particular type of transistor used. In the aforementioned cases, a duty cycle controlled clock that is generated by a clock generator based on the clock output is applied to the gate of the transistor. In some such cases, the operational detector includes a frequency controller that detects a frequency of the duty cycle controlled clock. In such cases, the electrical output corresponds to the frequency of the duty cycle controlled clock.

In other instances of the aforementioned embodiments, the operational detector includes a current sense circuit that is operable to sense a current associated with the primary winding. In such instances, the electrical output corresponds to the current associated with the primary winding.

Figure 1B:
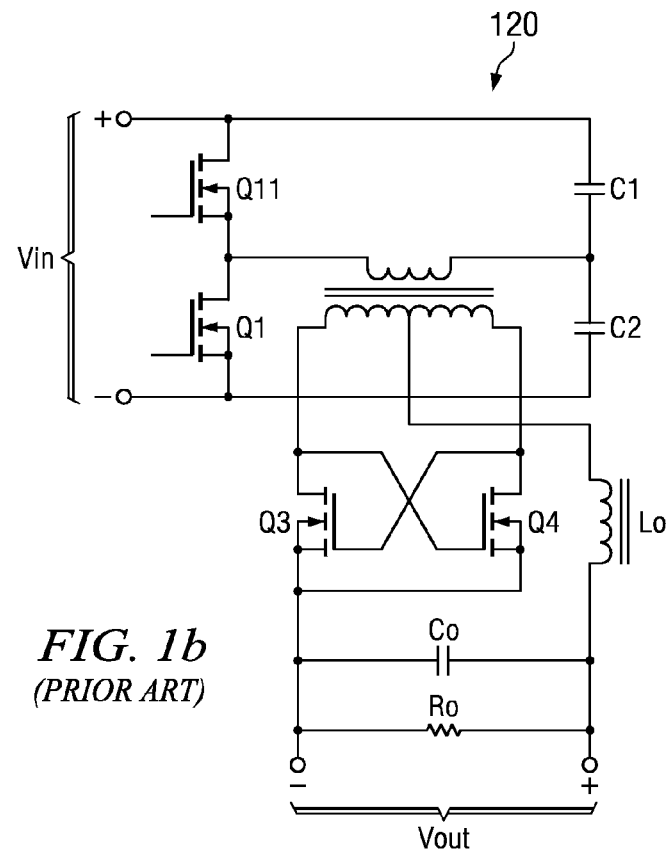
Figure 1C:
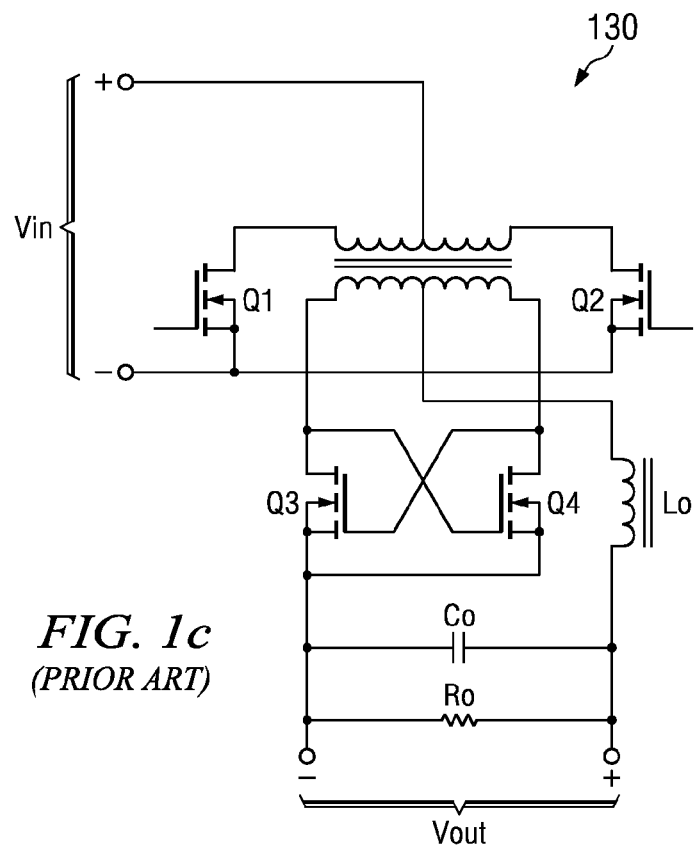
Figure 2:
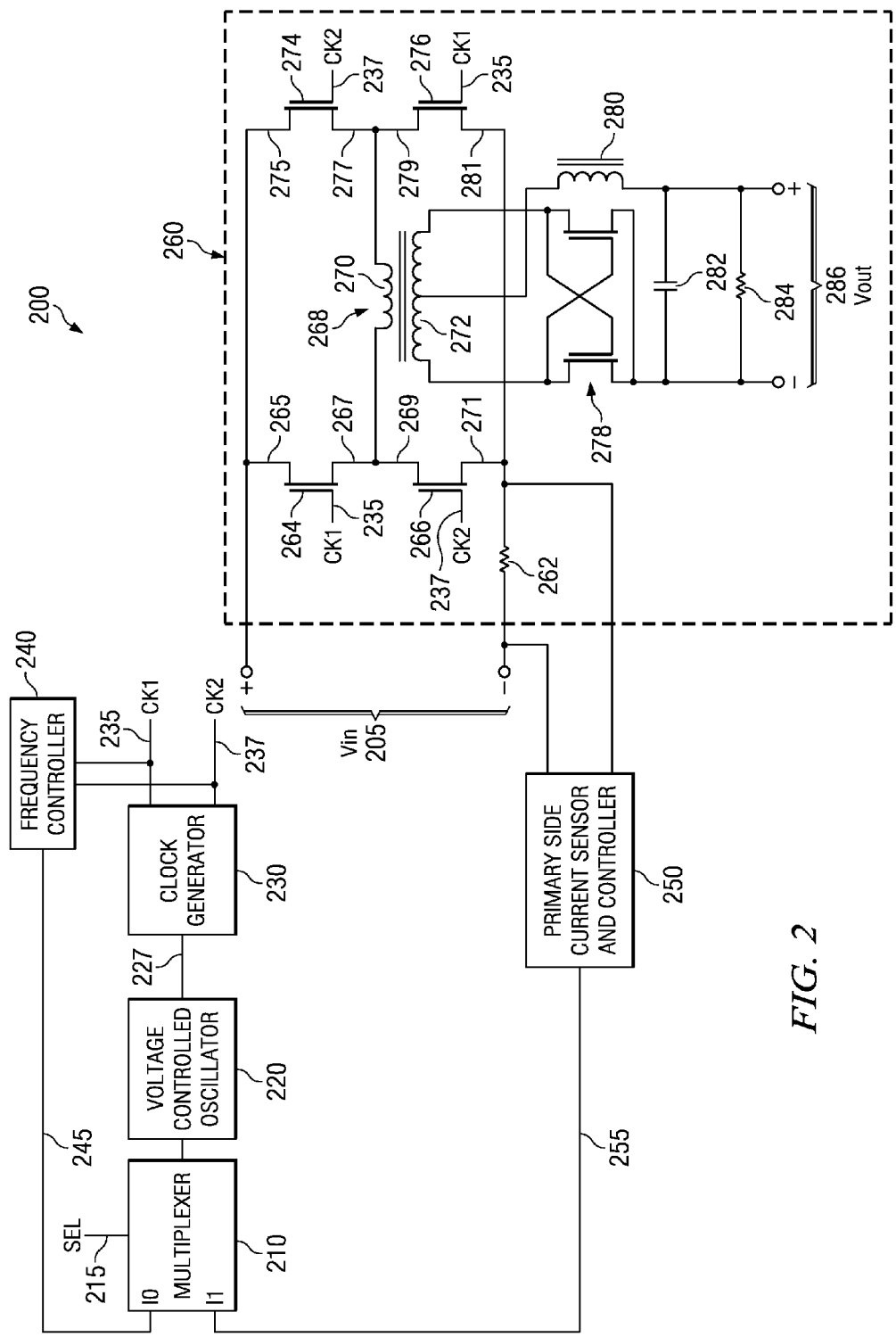
FIG. 2 shows a voltage converter in accordance with various embodiments of the present invention.

Turning to FIG. 2, a voltage converter 200 is depicted in accordance with various embodiments of the present invention. Voltage converter 200 includes a multiplexer 210, a voltage controlled oscillator 220, a clock generator 230, a frequency controller 240, a primary side current sensor and controller 250, and a converter 260. Converter 260 includes a transformer 268 with a primary winding 270 and a secondary winding 272. A voltage input 205 is selectably applied across primary winding 270 by a set of transistors 264, 266, 274, 276. In particular, a leg 265 of transistor 264 and a leg 275 of transistor 274 are electrically connected to one pole of voltage input 205, and a leg 271 of transistor 266 and a leg 281 of transistor 276 are electrically coupled to the other pole of voltage input 205 via a current sense resistor 262. The gate of transistor 264 and the gate of transistor 276 are electrically coupled to a first duty cycle controlled clock signal 235 provided by clock generator 230, and the gate of transistor 266 and the gate of transistor 274 are electrically coupled to a second duty cycle controlled clock signal 237 provided by clock generator 230. Secondary winding 272 is electrically coupled to a voltage output 286 via a rectifier 278, a resistor 284 that represents some type of loading, and a filter that includes a capacitor 282 and an inductor 280. It should be noted that converter 260 is similar to that of FIG. 1a. Further, it should be noted that with some modification, converter 260 may be replaced with a converter with a topology similar to that in either FIG. 1b or FIG. 1c. Alternatively, converter 260 may be replaced with any other type of converter known in the art.

Voltage controlled oscillator 220 may be any voltage controlled oscillator known in the art, or may be another type of oscillator that may be controlled by an input electrical signal. Voltage controlled oscillator 220 provides a clock output 227. Clock generator 230 receives clock output 227 and generates duty cycle controlled clock signal 235 and duty cycle controlled clock signal 237 that each have a defined duty cycle and operate at a frequency corresponding to the frequency of clock output 227. It should be noted that in alternative embodiments of the present invention that the connection of duty cycle controlled clock signal 235 and duty cycle controlled clock signal 237 may be different. For example, duty cycle controlled clock signal 235 may be connected to the gate of transistor 264 and an inverted version of duty cycle controlled clock signal 235 is connected to the gate of transistor 266; and duty cycle controlled clock signal 237 may be connected to the gate of transistor 274 and an inverted version of duty cycle controlled clock signal 237 is connected to the gate of transistor 276. Based on the disclosure provided herein, one of ordinary skill in the art will recognize a variety of couplings that may be used in relation to different embodiments of the present invention.

In operation, select input 215 is driven to select whether the operation of converter 260 will be controlled via frequency control using a voltage feedback 245 from frequency controller 240, or using a voltage feedback 255 from primary side current sensor and controller 250. Both types of control operate to limit current ripple across inductor 280, and only one type of control operates at any given time. In some implementations, only one type of control is implemented (i.e., either primary side current sensor and controller 250 or frequency controller 240 is implemented) removing the need for multiplexer 210.

When frequency control is selected via select input 215, duty cycle controlled clock signal 235 and duty cycle controlled clock signal 237 are used by frequency controller 240 to generate voltage feedback 245 that causes the frequency of clock output 227 to approximately satisfy the following equation during the start-up of voltage converter 200 when the duty cycle is changing from zero percent to about one hundred percent:

$$\text{Frequency} = k*D*(1-D),$$

where D is the duty cycle of duty cycle controlled clock signal 235 and duty cycle controlled clock signal 237, and k is a constant. In some embodiments of the present invention, maintaining the aforementioned Frequency within +/−40% is sufficient. In other cases, maintaining the Frequency within +/−20% is sufficient, and in yet other cases it may be maintained within +/−5% depending upon the desired control over the current ripple and other design considerations. By limiting the change to the frequency of clock output 227, the ripple current across inductor 280 can be controlled during start-up of voltage converter 200. This allows for use of less expensive components in place of, for example, inductor 280, and more reasonable current limits.

In contrast, when voltage feedback 255 from primary side current sensor and controller 250 is selected via select input 215, the frequency of clock output 227 is controlled by sensing the current across current sense resistor 262. The sensed current is used to generate voltage feedback 255 to cause the frequency of clock output 227 to approximately satisfy the following equation during the start-up of voltage converter 200 when the duty cycle of the duty cycle controlled clocks is changing from zero percent to about one hundred percent:

$$\text{Frequency} = k*D*(1-D),$$

where D is the duty cycle of duty cycle controlled clock signal 235 and duty cycle controlled clock signal 237, and k is a constant. In some embodiments, maintaining the aforementioned Frequency within +/−40% is sufficient. In other cases, maintaining the Frequency within +/−20% is sufficient, and in yet other cases it may be maintained within +/−5% depending upon the desired control over the current ripple and other design considerations. Again, by limiting the change to the frequency of clock output 227, the ripple current across inductor 280 can be controlled during start-up of voltage converter 200. This allows for use of less expensive components in place of, for example, inductor 280, and more reasonable current limits.

Figure 3B:
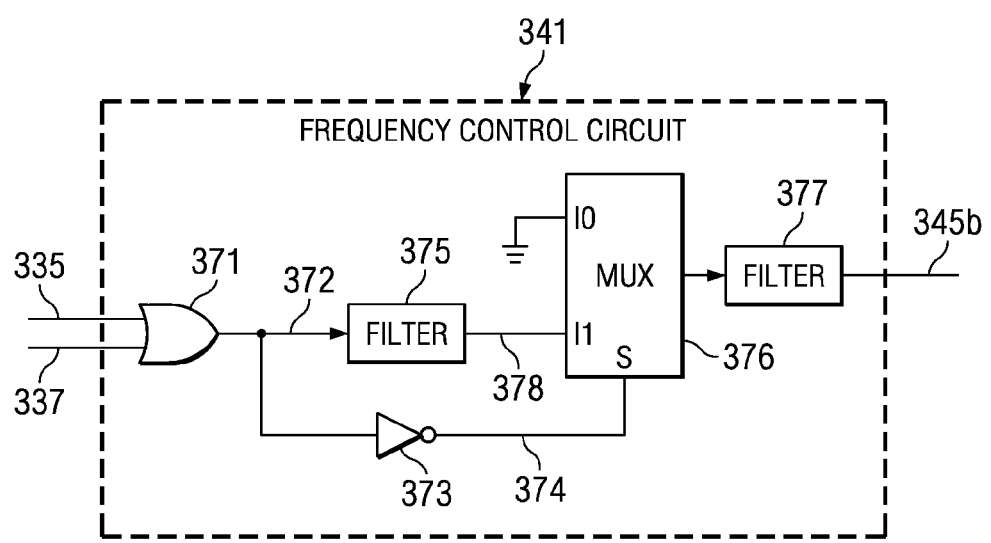
FIG. 3b shows an alternative frequency control circuit that may be used in relation to different embodiments of the present invention.
Figure 3A:
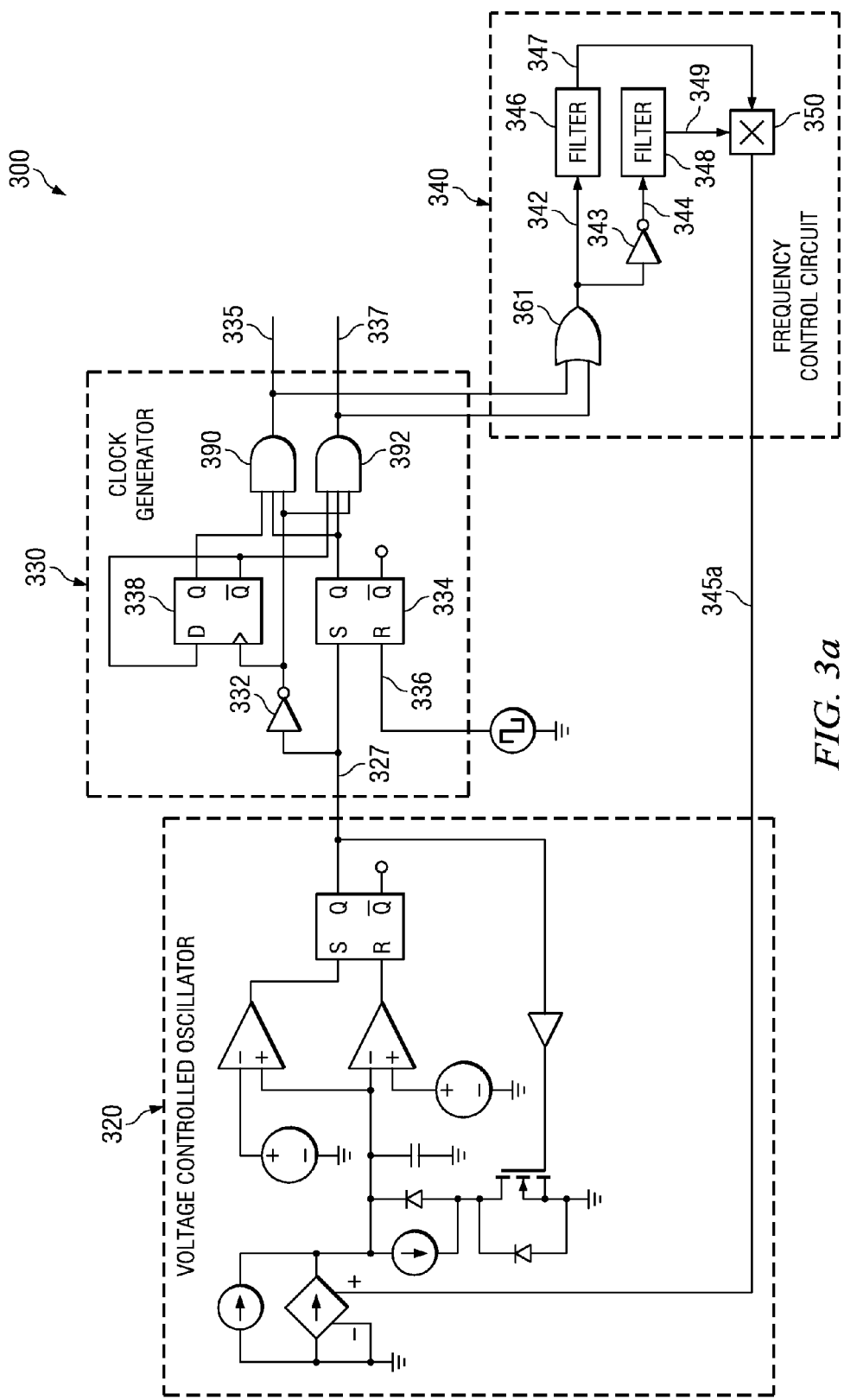
FIG. 3a depicts a controller that may be used in relation to various voltage converters in accordance with some embodiments of the present invention.

Turning to FIG. 3a, a controller 300 is depicted that may be used in relation to various voltage converters in accordance with some embodiments of the present invention. Controller 300 includes a voltage controlled oscillator 320, a clock generator 330 and a frequency control circuit 340 that together may be used in place of voltage controlled oscillator 220, clock generator 230 and frequency controller 240. Voltage controlled oscillator 320 provides a clock output 327 having a frequency that is at least in part controlled by a voltage feedback 345a from frequency control circuit 340.

Clock generator 330 receives clock output 327 and generates a first duty cycle controlled clock signal 335 and a second duty cycle controlled clock signal 337 that each have a defined duty cycle and operate at a frequency corresponding to the frequency of clock output 327. In this particular embodiment, clock generator 330 includes a set/reset flip-flop 334 that is set each time clock output 327 is asserted high, and reset each time a reference pulse 336 is asserted high. In addition, clock generator 330 includes a D flip-flop 338 that is clocked by clock output 327 after it is passed through an inverter 332. The inverted output of D flip-flop 338 is fed back as the D input. A first AND gate 390 logically ANDs the output of D flip-flop 338, the output of set/reset flip-flop 334 and clock output 327 after it is passed through an inverter 332. The output of AND gate 390 is duty cycle controlled clock 335. A second AND gate 392 logically ANDs the inverted output of D flip-flop 338, the output of set/reset flip-flop 334 and clock output 327 after it is passed through an inverter 332. The output of AND gate 392 is duty cycle controlled clock 337.

Frequency control circuit 340 receives duty cycle controlled clock 335 and duty cycle controlled clock 337, and based on the aforementioned inputs it provides voltage feedback 345a. In this embodiment, frequency control circuit 340 includes an OR gate 361 that logically ORs duty cycle controlled clock 335 and duty cycle controlled clock 337 to create an output 342. Output 342 is inverted by an inverter 343 to create an output 344. Output 342 is equivalent to the element (D), and output 344 is equivalent to the element (1−D) in the previously discussed frequency equation replicated below.

$$\text{Frequency} = k*D*(1-D).$$

A filter 346 operates to average the pulses of output 342 to create an analog voltage 347 and a filter 348 operates to average the pulses of output 344 to create an analog voltage 349. An analog multiplier 350 combines analog voltage 347 with analog voltage 349 to provide feedback voltage 345a that corresponds to D*(1−D). Again, feedback voltage 345a is provided to voltage controlled oscillator 320 where it is used to govern the frequency of clock output 327. By controlling frequency in accordance with the equation above, a substantially constant current ripple on the current through inductor 280 during changes in the duty cycle may be achieved.

Turning to FIG. 3b, an alternative frequency control circuit 341 is depicted that may be used in relation to different embodiments of the present invention. Frequency control circuit 341 may be used, for example, in place of frequency control circuit 340 of controller 300. Where such is the case, frequency control circuit 341 receives duty cycle controlled clock 335 and duty cycle controlled clock 337, and based on the aforementioned inputs it provides a voltage feedback 345b to voltage controlled oscillator 320. In this embodiment, frequency control circuit 341 includes an OR gate 371 that logically ORs duty cycle controlled clock 335 and duty cycle controlled clock 337 to create an output 372. Output 372 is inverted by an inverter 373 to create an output 374. Output 374 is applied as the select input of a multiplexer 376. A filter 375 operates to average the pulses of output 372 to create an analog voltage 378 that is applied to the '1' input of multiplexer 376. The '0' input of an analog multiplexer 376 is coupled to a reference voltage that in this case is ground. A filter 377 operates to average the pulses of the output of multiplexer 376 to create feedback voltage 345b. By doing so, feedback voltage 345b corresponds to D*(1−D). Feedback voltage 345b is provided to voltage controlled oscillator 320 where it is used to govern the frequency of clock output 327. Based on the disclosure provided herein, one of ordinary skill in the art will recognize other circuits that may be used in place of frequency control circuits 340, 341 to generate the desired voltage feedback that is proportional to D*(1−D).

Figure 3C:
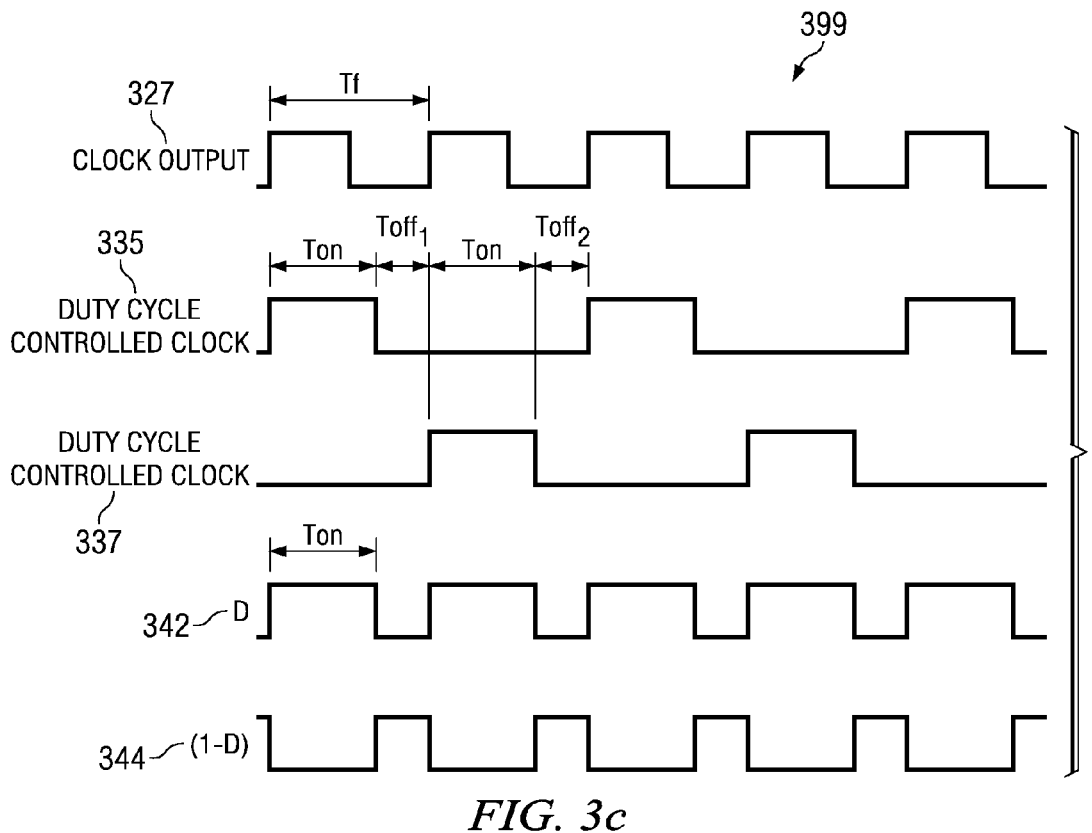

Turning to FIG. 3c, a timing diagram 399 shows an exemplary relationship between various signals of controller 300, and is applicable to controller 300 as modified to include frequency control circuit 341 in place of frequency control circuit 340. As shown, clock output 327 is operating at a frequency corresponding to a period, $T_f$. Each of duty cycle controlled clock 335 and duty cycle controlled clock 337 exhibit an on period (i.e., a time when the signal is asserted high), Ton, and an off period (i.e., a time when the signal is asserted low), $T_{off}$. Output 342 (similar to output 372) is shown as a logical OR of duty cycle controlled clock 335 and duty cycle controlled clock 337, and output 344 (similar to output 374) is shown as the inverse of output 342.

In many cases, it is desirable to operate at nominal condition with the maximum possible duty cycle. The maximum duty cycle is, of course one-hundred percent where Toff is zero, and Ton extends the entire operational period. However, the maximum possible duty cycle is less than one-hundred percent because in practice there is a dead time set between pulses in each half switching cycle to avoid cross conduction. Also, transistors 264, 266, 274, 276 are not ideal and the rise and fall time of pulses applied to transformer 268 reduce the effective duty cycle. To avoid unnecessary frequency modulation at steady state nominal condition, it may be beneficial to keep the frequency constant above some duty cycle threshold. In some embodiments of the present invention, the duty cycle may be chosen, for example, between ninety percent and just less than one-hundred percent. Also, when the duty cycle is very low (e.g., during a current limit), it is reasonable not to increase the frequency for some time to avoid possible current build up because of minimum on time limit that the converter is able to generate. It should be noted that the previously described duty cycle thresholds can be set differently depending upon the particular case, and based on the disclosure provided herein, one of ordinary skill in the art will recognize a variety of thresholds that may be set to accomplish the various purposes.

Figure 4:
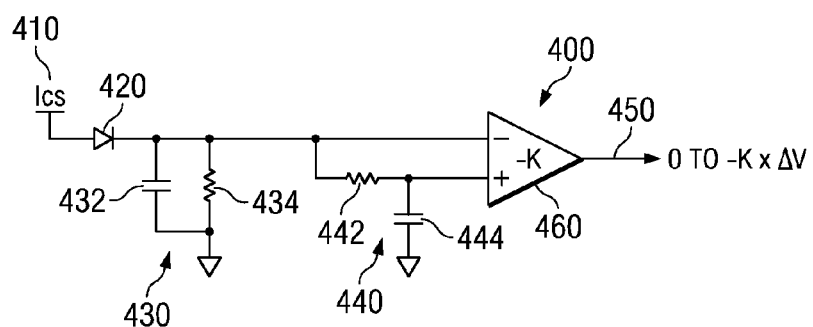
FIG. 4 depicts a current based controller circuit that may be used in relation to various embodiments of the present invention.

Turning to FIG. 4, a current based controller circuit 400 is depicted that may be used in relation to various embodiments of the present invention. Current based controller circuit 400 is used to monitor current through inductor 280 that is reflected into the primary side of transformer 268. This is not straightforward in the case of an unregulated power converter as a current is only available during the on time of transistors 264, 266, 274, 276. Current based controller circuit 400 may be used in place primary side current sensor and controller 250. In particular, the current traversing current sense resistor 262 is sensed and provided as a sense current 410. Any current sensing circuit known in the art may be used to derive sense current 410.

Current based controller circuit 400 includes a peak detection filter 430 including a diode 420, a capacitor 432 and a resistor 434; and an input filter 440 that includes a capacitor 444 and a resistor 442. The components of peak detection filter 430 and input filter 440 are selected to provide the averaged current sense signal within the on time (e.g., Ton of FIG. 3c) to a non-inverting input of an operational amplifier 460, while at the same time providing peak signal to an inverting input of operational amplifier 460. In this way, any increase in current ripple associated with sense current (i.e., corresponding to the current through inductor 280) causes an increase in a voltage signal 450 output from operational amplifier 460. Voltage signal 450 is fed back to voltage controlled oscillator 220 where it operates to govern the frequency of clock output 227. To do this, the time constant of peak detection filter 430 (i.e., the filter feeding the inverting input of operational amplifier 460) is less than a period expected on sense current 410, while the time constant of input filter 440 (i.e., the filter feeding the non-inverting input of operational amplifier 460) is substantially greater extending, for example, two or more periods.

In conclusion, the present invention provides novel systems, devices, methods for voltage conversion and operation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An unregulated voltage converter having an unregulated output voltage, the unregulated voltage converter comprising:
    a transformer, wherein the transformer includes a first winding and a second winding;
    an operational detector, wherein the operational detector provides an electrical output signal as a predetermined function of a voltage input signal applied to the transformer;
    a controllable oscillator, wherein the controllable oscillator provides a duty cycle clock output with a frequency corresponding to the electrical output; and
    wherein the clock output at least in part controls application of the voltage input signal applied to the first winding to control ripple in an output of the unregulated voltage converter during times of low duty cycle operation including start-up of the unregulated converter and current limit wherein the frequency of the clock is determined by the equation: Frequency=k*D*(1−D),
    where D is the duty cycle of duty cycle controlled clock signal and k is a constant.

2. The voltage converter of claim 1, wherein the voltage converter further comprises:
    a transistor, wherein a first leg of the transistor is electrically coupled to the first winding, wherein a second leg of the transistor is electrically coupled to the voltage input; and
    a clock generator that receives the clock output and provides a duty cycle controlled clock signal to the gate of the transistor.

3. The voltage converter of claim 2, wherein the operational detector includes a frequency controller, wherein the frequency controller detects a frequency of the duty cycle controlled clock signal, and wherein the electrical output corresponds to the frequency of the duty cycle controlled clock signal.

4. The voltage converter of claim 1, wherein the voltage converter further comprises:
    a first transistor, wherein a first leg of the first transistor is electrically coupled to the first winding, wherein a second leg of the first transistor is electrically coupled to the voltage input;
    a second transistor, wherein a first leg of the second transistor is electrically coupled to the first winding, wherein a second leg of the second transistor is electrically coupled to the voltage input;
    a clock generator that receives the clock output and provides a first duty cycle controlled clock signal to a gate of the first transistor and a second duty cycle controlled clock signal to a gate of the second transistor.

5. The voltage converter of claim 1, wherein the operational detector includes a current sense circuit, wherein the current sense circuit is operable to sense a current associated with the first winding, and wherein the electrical output corresponds to the current associated with the first winding.

6. The voltage converter of claim 1, wherein the voltage converter includes a voltage output, and wherein the voltage output is electrically coupled to the second winding.

7. The voltage converter of claim 1 wherein the ripple current in the output of the voltage converter is defined by the equation:

$$\Delta IL = \frac{Vin * D(1-D)}{2 * N * L * F},$$

where Vin is the voltage input to the primary winding, D is a duty cycle, and F is the frequency of a clock provided to transistors connected to a voltage input side of the circuits, L is an inductor on the voltage output side of a circuit; and N is the turns ratio of the transformer.

8. A voltage converter, the voltage converter comprising:
    a transformer, wherein the transformer includes a first winding and a second winding;
    an operational detector, wherein the operational detector provides an electrical output corresponding to an operational characteristic of the transformer;
    a controllable oscillator, wherein the controllable oscillator provides a clock output with a frequency corresponding to the electrical output, wherein the clock output at least in part controls application of a voltage input to the first winding;
    a first transistor, wherein a first leg of the first transistor is electrically coupled to the first winding, wherein a second leg of the first transistor is electrically coupled to the voltage input;
    a second transistor, wherein a first leg of the second transistor is electrically coupled to the first winding, wherein a second leg of the second transistor is electrically coupled to the voltage input;
    a clock generator that receives the clock output and provides a first duty cycle controlled clock signal to a gate of the first transistor and a second duty cycle controlled clock signal to a gate of the second transistor; and
    wherein the operational detector includes a frequency controller, wherein the frequency controller includes a logic function that logically combines the first duty cycle controlled clock signal with the second duty cycle controlled clock signal, wherein an output of the logic function is filtered to create a first average voltage, wherein the output of the logic function is inverted and the inverted output is filtered to create a second average voltage, and wherein the first average voltage and the second average voltage are multiplied to create the electrical output.

9. A voltage converter, comprising:
    a transformer, wherein the transformer includes a first winding and a second winding;
    an operational detector, wherein the operational detector provides an electrical output signal as a predetermined function of a voltage input signal applied to the transformer, wherein the operational detector includes a frequency controller, wherein the frequency controller includes a logic function that logically combines the first duty cycle controlled clock signal with the second duty cycle controlled clock signal, wherein an output of the logic function is filtered to create an average voltage, wherein the frequency controller includes a multiplexer, wherein a selector input of the multiplexer is an inverted version of the output of the logic function, wherein one input of the multiplexer is the average voltage, and wherein another input of the multiplexer is a reference voltage;

a controllable oscillator, wherein the controllable oscillator provides a clock output with a frequency corresponding to the electrical output; and further comprising a first transistor, wherein a first leg of the first transistor is electrically coupled to the first winding, wherein a second leg of the first transistor is electrically coupled to the voltage input;

a second transistor, wherein a first leg of the second transistor is electrically coupled to the first winding, wherein a second leg of the second transistor is electrically coupled to the voltage input;

a clock generator that receives the clock output and provides a first duty cycle controlled clock signal to a gate of the first transistor and a second duty cycle controlled clock signal to a gate of the second transistor;

wherein the clock output at least in part controls application of the voltage input signal applied to the first winding to control ripple in an output of the voltage converter.

10. The voltage converter of claim 9, wherein the reference voltage is a ground, and wherein the logic function is an OR function.

11. The voltage converter of claim 9, wherein the average voltage is a first average voltage, wherein an output of the multiplexer is filtered to create a second average voltage, and wherein the second average voltage is the electrical output.

12. A method for providing voltage conversion having reduced ripple current, the method comprising:

providing a transformer, wherein the transformer includes a first winding and a second winding;

applying a periodically gated voltage input to the first winding, wherein the periodic gating has a time varying duty cycle and a time varying frequency; and maintaining a mathematical combination of the time varying duty cycle and the time varying frequency defined by:

(time varying duty cycle)(1-time varying duty cycle)/(time varying frequency), substantially constant.

13. The method of claim 12, wherein a voltage output is electrically coupled to the second winding.

14. The method of claim 12, wherein maintaining the mathematical combination of the time varying duty cycle and the time varying frequency substantially constant includes sensing a current passing through the first winding.

15. The method of claim 12, wherein the method further comprises:

providing a first transistor, wherein a first leg of the first transistor is electrically coupled to the first winding, wherein a second leg of the first transistor is electrically coupled to the voltage input;

providing a second transistor, wherein a first leg of the second transistor is electrically coupled to the first winding, wherein a second leg of the second transistor is electrically coupled to the voltage input;

providing a clock generator that receives a clock signal and provides a first duty cycle controlled clock signal and a second duty cycle controlled clock signal; and wherein applying the periodically gated voltage input includes applying the first duty cycle controlled clock signal to a gate of the first transistor and applying the second duty cycle controlled clock signal to a gate of the second transistor.

16. The method of claim 15, wherein the method further comprises:

providing a frequency controller, wherein the frequency controller includes a logic function that logically combines the first duty cycle controlled clock signal with the second duty cycle controlled clock signal, wherein an output of the logic function is filtered to create a first average voltage, wherein the frequency controller includes a multiplexer, wherein a selector input of the multiplexer is an inverted version of the output of the logic function, one signal input of the multiplexer is the first average voltage, and another other signal input of the multiplexer is a reference voltage; and generating a second average voltage from the output of the multiplexer; and adjusting a frequency of the clock signal based on the second average voltage.

17. The method of claim 15, wherein the method further comprises:

providing a frequency controller, wherein the frequency controller includes a logic function that logically combines the first duty cycle controlled clock signal with the second duty cycle controlled clock signal, wherein an output of the logic function is filtered to create a first average voltage, wherein the output of the logic function is inverted and the inverted output is filtered to create a second average voltage, and wherein the first average voltage and the second average voltage are multiplied to create the electrical output.

18. A power distribution system, wherein the power distribution system comprises:

at least one unregulated voltage converter, wherein the unregulated voltage converter has an unregulated output voltage and includes:

a transformer, wherein the transformer includes a first winding and a second winding;

an operational detector, wherein the operational detector provides an electrical output signal as a predetermined function of a voltage input signal applied to of the transformer;

a controllable oscillator, wherein the controllable oscillator provides a duty cycle clock output with a frequency corresponding to the electrical output;

wherein the clock output at least in part controls application of the voltage input signal applied to the first winding to control ripple in an output of the unregulated voltage converter during times of low duty cycle operation including start-up of the unregulated converter and current limit, wherein the frequency of the clock is determined by the equation: Frequency=$k*D*(1-D)$, where D is the duty cycle of duty cycle controlled clock signal and k is a constant; and wherein a voltage output is electrically coupled to the second winding.

19. The power distribution system of claim 18, wherein the operational characteristic of the transformer is a current traversing the first winding.

20. The power distribution system of claim 18, wherein the operational characteristic of the transformer is a duty cycle of a clock gating a voltage input to the first winding.

* * * * *